United States Patent [19]

Terashita

[11] Patent Number: 5,703,672
[45] Date of Patent: Dec. 30, 1997

[54] METHOD OF MAKING A PHOTOGRAPHIC PRINT

[75] Inventor: Takaaki Terashita, Kanagawa, Japan

[73] Assignee: Fuji Photo Film Co., Ltd., Kanagawa, Japan

[21] Appl. No.: 572,658

[22] Filed: Dec. 14, 1995

[30] Foreign Application Priority Data

Dec. 22, 1994 [JP] Japan .................................. 6-320525

[51] Int. Cl.$^6$ ..................................................... G03B 27/80
[52] U.S. Cl. ..................................................... 355/38; 355/77
[58] Field of Search ........................... 355/1, 18, 32, 355/35, 38, 67–71, 77

[56] References Cited

U.S. PATENT DOCUMENTS

| | | | |
|---|---|---|---|
| 3,937,573 | 2/1976 | Rising | 355/83 |
| 4,335,399 | 6/1982 | Matsumoto | 358/80 |
| 4,416,539 | 11/1983 | Terashita | 355/77 |
| 4,589,766 | 5/1986 | Fürsich et al. | 355/38 |
| 4,627,719 | 12/1986 | Nitsch et al. | 355/41 |
| 4,641,959 | 2/1987 | Terashita | 355/77 |
| 4,884,102 | 11/1989 | Terashita | 355/77 |
| 5,210,570 | 5/1993 | Minamisawa et al. | 355/38 |
| 5,278,921 | 1/1994 | Nakamura et al. | 382/18 |
| 5,353,095 | 10/1994 | Terashita | 355/38 |
| 5,475,493 | 12/1995 | Yamana | 356/404 |
| 5,502,776 | 3/1996 | Manabe | 382/172 |
| 5,561,494 | 10/1996 | Terashita | 355/38 |

*Primary Examiner*—R. L. Moses
*Attorney, Agent, or Firm*—Sughrue, Mion, Zinn, Macpeak & Seas, PLLC

[57] ABSTRACT

A method of making a high-quality print avoids carrying out photometry twice on images on a film. In a first transporting process for transporting the film in a first direction, photometry is carried out on all of the images on the film that are to be copied by dividing the images into a number of pixels, logarithmically transforming thus obtained photometric values into photometric data sets, and storing all thus transformed photometric data sets in correspondence with individual images on the film. At least some of the photometric data sets are used to determine a condition of selection for selecting photometric data of pixels. The photometric data thus selected is used in determining the exposure amount of the images, and photographic prints are made during a second transporting process using the determined exposure amounts.

20 Claims, 6 Drawing Sheets

1

METHOD OF MAKING A PHOTOGRAPHIC PRINT

BACKGROUND OF THE INVENTION

1. Field of the Invention

The present invention relates to a method of making a print, and in particular to a method of making a print which has a first transporting process for transporting film in a first direction and a second transporting process for transporting the film in a second direction opposite to the first direction so as to print a photographic image.

2. Description of the Prior Art

Conventionally, a notch puncher is widely used for photographic printing. In using the notch puncher, an operator observes a negative film, forms a notch at a side edge of the negative film in a position corresponding to a frame in which an image to be printed is recorded, and determines an exposure correction amount. The determined exposure correction amount is stored in a recording medium such as a paper tape, magnetic memory or the like. In the case of using the notch puncher, the negative film and the recording medium are both loaded on a photographic printing apparatus. The negative film is transported until an image to be printed reaches a printing position during which exposure correction amounts are successively read from the recording medium. The image is then printed on photographic printing paper synchronously with a transport of the negative film. In the photographic printing apparatus, the negative film is transported in the opposite or same direction of a transport in the notch puncher.

U.S. Pat. No. 4,416,539 discloses a method which replaces the conventional method in which an operator determines exposure correction amounts visually on the notch puncher. According to the disclosed method, each frame of a single piece of film is scanned by a scanner so as to obtain a photometric value, and an image characteristic value of each frame is obtained from thus obtained photometric value. Then, a mean characteristic value for the film is obtained from thus obtained image characteristic values. The mean characteristic value is used for identifying an anomalous frame or frames, whereby an exposure amount is determined.

U.S. Pat. No. 3,937,573 discloses a photographic printing method wherein an exposure amount for a frame to be printed is determined by a function of an image characteristic value of the frame and an image characteristic value of the film including the frame or of a plurality of pieces of film having the same history.

U.S. Pat. No. 4,627,719 discloses a copying apparatus which includes means for transporting a photographic film in a first direction, means for photoelectrically monitoring each of predetermined parameters during the transport in which a signal representing a characteristic value indicative of a predetermined parameter is generated and stored, and means for reproducing an image in a monitored frame during a transport in a second direction opposite to the first direction in which the amount of light used for copying images is varied through a function of a stored signal.

DEP No. 3713855.3 discloses an exposure control method wherein in a first process (first direction), a characteristic value of film is measured along the length of the film and wherein in a second process (second direction), a frame to be printed is positioned in a copying station and undergoes photometry so as to obtain a characteristic value of the frame, thereby making it unnecessary to set a measuring range in the first process.

Thus, according to the conventional practice, the following is known.

(1) Exposure correction amounts are determined in a first transporting direction, and a printing process is carried out in a second transporting direction opposite to the first transporting direction.

(2) An image characteristic value of each piece of film is obtained and stored. After completing photometry on a single piece or a plurality of pieces of film or a series of frames, the mean value of the image characteristic values of the film is obtained. An exposure amount is determined for each frame using a function of the image characteristic value of each frame and the obtained mean image characteristic value.

(3) A mean image characteristic value is obtained for a single piece of film during a transport in the first transporting direction. Positioning, photometry, determination of an exposure amount, and exposure are carried out during a transport in the second transporting direction.

Moreover, a method is known wherein pixels of a frame are selected based on image data which are prepared from a number of pieces of film and wherein the selected pixels are used for determining an exposure amount. The image data which are prepared from a number of pieces of film are stable because the data are not affected by image data of each piece of film in which a subject of a particular kind is recorded. However, thus prepared image data do not reflect changes in a photographic light source and variations, due to elapse of time, in the characteristics of a piece of film which includes a frame to be subjected to printing. Accordingly, it is preferable that pixels be selected based on data including image data of a single piece of film. U.S. Pat. No. 5,353,095 discloses a method of determining an exposure amount based on image data which are prepared from a number of pieces of film and image data of a single piece of film.

However, according to the above-mentioned technique disclosed in U.S. Pat. No. 4,627,719, image data of a single piece of film are not prepared until a transport in the first direction is completed. Accordingly, the image data of a single piece of film can not be utilized for preparing a characteristic value of each frame. Also, according to the technique, a signal indicative of a characteristic value is stored during the transport in the first direction. As a result, it is difficult to prepare a characteristic value of each frame using image data of a single piece of film after the transport in the first direction is completed.

Also, the technique disclosed in DEP No. 3713855.3 does not cover the utilization of image data of a single piece of film for preparing a characteristic value of each frame in the second process. Further, photometry is carried out in both the first and second processes. As a result, in a system where film must be halted so as to carry out photometry when a printing position is reached, a processing capability drops greatly. Also, since an exposure amount is calculated after photometry is completed in the second process, the calculation cannot be carried out while the preceding frame is being exposed. This is inefficient.

In the above-mentioned prior arts, pixels of each frame are not selected for preparing a characteristic value, and mean image data of a single piece of film are not utilized for preparing a characteristic value of each frame. As a result, an obtained characteristic value of each frame has a potential of color failure and is insufficient in accuracy for determining an exposure amount.

SUMMARY OF THE INVENTION

An object of the present invention is to solve the above-mentioned problems, and to provide a method of making a print in which data about a single piece of film are stored, pixels are selected based on data including the data about the single piece of film, and an exposure amount is determined for printing, and which can makes a high-quality print without carrying out photometry twice for determining the exposure amount.

A method of making a print according to the present invention has a first transporting process for transporting a film in a first direction and a second transporting process for transporting film in a second direction wherein an image on the film is copied on a photographic copying apparatus so as to make a print. The method comprises the steps of carrying out photometry on at least all images on film to be copied with a single piece of the film by dividing the image on the film into a number of pixels, logarithmically transforming thus obtained photometric values into photometric data sets, and storing all thus transformed photometric data sets in correspondence with individual images on the film in the first transporting process, reading a plurality of the photometric data sets and determining a condition of selection for selecting photometric data of pixels for use in determining an exposure amount, and selecting photometric data of pixels which meet the condition of selection from photometric data sets of images on the film to be copied and making a print based on thus selected photometric data in the second transporting process.

As described above, the method of making a print according to the present invention has a first transporting process for transporting a film in a first direction and a second transporting process for transporting the film in a second direction wherein an image on film is copied on a photographic copying apparatus so as to make a print. In the first transporting process, an image on the film is divided into a number of pixels, photometry is carried out on at least all images on film to be copied, thus obtained photometric values are logarithmically transformed into photometric data sets, and thus transformed photometric data sets are all stored in correspondence with individual images on the film.

After the photometric data sets are all stored, a plurality of photometric data sets are read and used for determining a condition of selection for selecting photometric data of pixels for use in determining an exposure amount.

In the second transporting process, photometric data of pixels which meet the condition of selection are selected from photometric data sets of images on the film to be copied, and a print is made based on the selected photometric data.

The second direction, if along the length of negative film, may be identical or opposite to the first direction. When the second direction is the same as the first direction, the film needs to be reset on a photographic copying apparatus.

According to the present invention, photometric data sets of images on the film, not characteristic values of the images on the film, are stored, and photometric data of pixels for use in determining an exposure amount are selected from the photometric data sets. Accordingly, highly accurate characteristic values of images on the film are obtained without carrying out photometry again on the images on the film, whereby a high-quality print can be made.

In this case, a condition applicable as a condition of selection is a condition of standardization which is determined based on first mean image data which are calculated from a plurality of photometric data sets selected from the stored sets. Further, the first mean image data may be calculated from photometric data of pixels which are selected based on second mean image data which are obtained from photometric data of a number of images on a number of pieces of film.

As a result of determining the condition of standardization as described above, the second transporting process can employ the steps of reading photometric data sets of images on the film to be copied, standardizing the read photometric data sets in accordance with the condition of standardization, selecting photometric data of pixels for use in determining an exposure amount on the basis of the standardized photometric data, and making a print based on the selected photometric data. Further, when the second mean image data are obtained from photometric data of a number of images on a number of pieces of film, thus obtained second mean image data are stable because the data are not influenced by the kind of a subject recorded on each piece of film. Accordingly, by calculating the first mean image data on the basis of the second mean image data, the first mean image data can be obtained accurately and efficiently. Also, by determining the condition of standardization on the basis of thus accurately obtained first mean image data, photometric data which deviates from characteristics of the same kind of film can be removed, whereby a high-quality print can be made.

DETAILED DESCRIPTION OF THE PREFERRED EMBODIMENTS

Embodiments of the present invention will now be described in detail with reference to the accompanying drawings.

Embodiment 1

Figure 1:
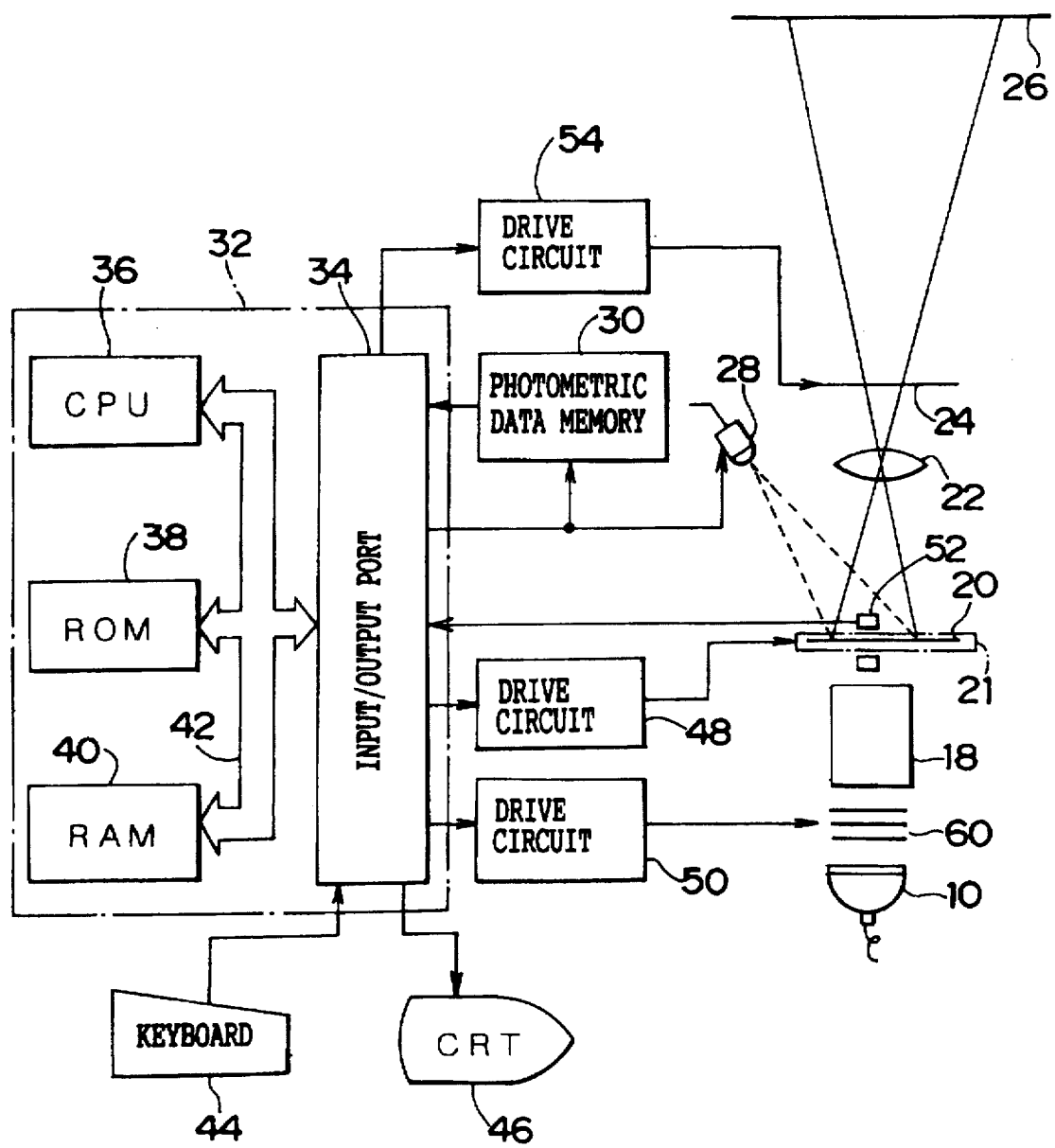
FIG. 1 is a schematic diagram showing a photographic printing apparatus which is usable with embodiments of the present invention.

FIG. 1 shows a photographic printing apparatus to which the present invention is applicable.

A mirror box 18 and a lamp house 10 provided with a halogen lamp are disposed under a negative film carrier 21 which holds a color negative film 20 with a pair of rollers and transports the negative film in the direction of length thereof. A light-quality adjusting filter 60 is disposed between the mirror box 18 and the lamp house 10. As well known, the light-quality adjusting filter 60 includes a yellow (Y) filter, a magenta (M) filter, and a cyan (C) filter, which are advanced into/retracted from the path of light.

A lens 22, a black shutter 24, and color paper 26 are disposed in this order above the negative film carrier 21. Accordingly, light emitted from the lamp house 10 passes through the light-quality adjusting filter 60, the mirror box 18, the negative film 20 carried on the negative film carrier 21, and then the lens 22, so that an image on the negative film 20 is reproduced on the color paper 26 by the lens 22.

A DX code is recorded in the form of a bar code on the side edge portion of the negative film 20. The DX code indicates the kind of the negative film 20. Further, a notch is formed at a position corresponding to each frame. In order to detect the DX code and a notch, the negative film carrier 21 has a detector 52 which includes a light emitting element and a light receiving element, which are disposed such that the side edge portion of the negative film 20 is situated between the light emitting element and the light receiving element.

A scanner 28 is disposed in an inclined direction with respect to the optical axis of the above-mentioned image forming optical system in such a position that the density of an image on the negative film 20 can be measured. The scanner 28 comprises a two-dimensional image sensor provided with a CCD, so that an image on the negative film 20 is divided into a number of pieces and that density of each of red (R), green (G), and blue (B) is measured for each of the pieces. The scanner 28 can divide an image in a frame positioned on the negative film carrier 21 into a number of pieces and carry out photometry in three wavelength bands corresponding to R, G, and B.

The scanner 28 is connected to an exposure amount determining apparatus 32 via a photometric data memory 30. The photometric data memory 30 logarithmically transforms photometric values obtained through the scanner 28 and stores thus transformed values. The exposure amount determining apparatus 32 comprises a personal computer. Photometric values may be logarithmically transformed by the personal computer and then stored in the photometric data memory 30.

The exposure amount determining apparatus includes an input/output port 34, a CPU 36, a ROM 38, a RAM 40, and buses including a data bus and a control bus for interconnection therebetween. The ROM 38 contains an exposure amount control routine, which will be described later.

The input/output port 34 of the exposure amount determining apparatus 32 is connected to the photometric data memory 30 so as to control read/write timing and to the scanner 28 so as to control photometric timing.

Also, the input/output port 34 is connected to a motor for driving a pair of rollers of the negative film carrier 21 via a drive circuit 48, to a drive section of the light-quality adjusting filter 60 via a drive circuit 50, and to a drive section of the black shutter 24 via a drive circuit 54. A keyboard 44, the detector 52, and a CRT 46 are connected to the input/output port 34.

A control routine of the first embodiment will now be described. When the negative film 20 is loaded on the negative film carrier 21 and when an unillustrated start switch is turned on, the negative film carrier 21 is driven in step 102, thereby transporting the negative film in a first direction along the direction of length of the negative film. The negative film may be transported from the lead end thereof or the tail end thereof. In step 104, a first frame is set in a printing position by detecting a corresponding notch with the detector. The frame may be set in the printing position by detecting the edge thereof.

In step 106, the scanner 28 divides an image in the frame which is set in the printing position, into a number of pixels, and carries out photometry for each of R, G, and B with respect to the pixels. In step 108, all sets of photometric values (photometric values of all pixels) are logarithmically transformed, and thus logarithmically transformed photometric values are stored as photometric data sets for each frame in the photometric data memory 30. Photometric data of R, G, and B for each frame is stored in a predetermined array in the photometric data memory 30. Photometric data of R, G, and B may be stored uncompressed or in a compressed state for reducing memory consumption. Thus, photometric data sets of R, G, and B are stored for each frame in the photometric data memory 30.

In next step 110, the number of frames which have undergone photometry is counted. In step 112, whether or not photometry is completed with a single piece of negative film is determined from the count value. If it is judged in step 112 that photometry has not been completed with the single piece of negative film, then processing returns to step 102, and the negative film is transported by one frame in the first direction as described above. Then, photometry is again carried out, and thus obtained photometric data sets are stored. Thus, photometric data sets for three colors, R, G, and B are all stored in the memory for frames on the single piece of negative film. That is, photometric data sets are stored at least for images in all frames to be copied.

In step 114, a plurality of frames are selected for calculating first mean image data. The first mean image data represent the average of image data of a plurality of images including an image or images to be printed. In step 116, photometric data sets for the selected frames are read from the memory. In step 118, the first mean image data are calculated.

Data which can be employed as the first mean image data are mean color densities or mean color density differences (for example, R–G and G–B) which are obtained from photometric data sets of a plurality of images including an image in a frame to be printed with respect to density of one color (for example, G-density) or mean density of three colors ((R+G+B)/3). Further, a functional expression or table values which are prepared from photometric data sets may be used for the calculation of the first mean image data.

The first mean image data of a plurality of images including an image to be printed can be obtained by selecting all frames of a single piece of film, and calculating the first mean image data based on photometric data sets of the images on the single piece of film.

However, it is not necessary to calculate the first mean image data based on photometric data sets of all frames on a single piece of film. When a transport in the first direction is completed, i.e. when photometry and the storage of photometric data sets are completed with a single piece of film, the number of frames on the single piece of film is determined. Accordingly, frames for use in calculating the first mean image data may be selected in accordance with the total number of frames on a single piece of film (for example, when the single piece of film has 36 frames, either one of every two frames may be selected), and the first mean image data may be calculated based on photometric data sets of thus selected frames.

Also, when a certain frame is found to deviate greatly from the first mean image data, the frame may be excluded from those frames to be selected for calculating the first mean image data, i.e. photometric data sets of the frame may not be used in calculating the first mean image data. Also, even when a certain frame is to be excluded from those frames to be copied as a result of analysis of photometric data of the frame, photometric data sets of the frame may be used for calculating the first mean image data.

In step 120, a first condition of standardization is determined for standardizing photometric data sets, as will be described later.

In step 122, the negative film is transported in a direction (second direction) opposite to the above-mentioned first direction without removing the negative film from the negative film carrier. In step 124, the first frame is set in the printing position by detecting a corresponding notch. In determining the first condition of standardization, when the last frame which has undergone photometry and storage of photometric data sets is positioned in the printing position, this last frame becomes the first frame in transporting the negative film in the second direction. Accordingly, an initial transport in the second direction is not necessary for the last frame.

In step 126, photometric data sets are read from the memory for a frame which is set in the printing position. In step 128, the photometric data sets are standardized, as described below, in accordance with the first condition of standardization which was determined in step 120.

Figure 5:
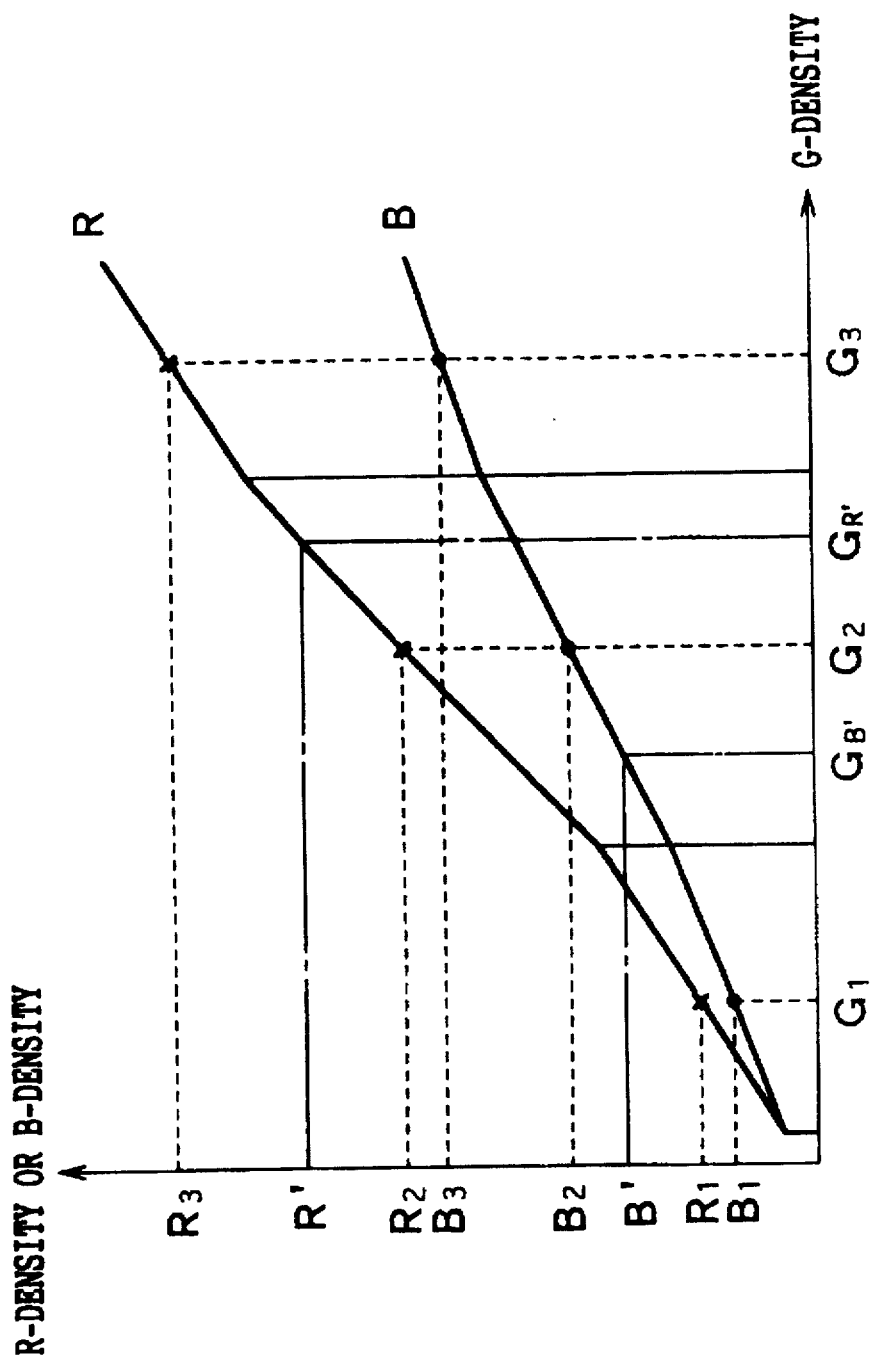
FIG. 5 is a graph showing standardization curves for standardizing photometric data.

First, photometric data of a low-density portion are subtracted from each of many photometric data sets of three colors, thereby obtaining corrected photometric data sets of three colors. Photometric data of a base portion of a reference negative film or a film including frames to be printed can be used as the photometric data of a low-density portion. Using predetermined standardization curves (or standardization table) as shown in FIG. 5, corrected photometric data sets of B and R are converted to density of G, thereby obtaining standardized (normalized) photometric data sets of B, R, and G. Photometric data are standardized so as to make correction for a difference in density of negative film derived from a difference in the kind of film and a difference in development process. That is, photometric data are converted so as to obtain a constant density and colors for the same subject regardless of a difference in the kind of film and a difference in development process. In addition to the above-mentioned method of standardization, the methods disclosed in U.S. Pat. Nos. 4,335,399 and 4,884,102 can be used for standardization.

In step 130, pixels are selected, and in step 132, an image characteristic value is calculated from the selected pixels. Values which can be used as an image characteristic value are the maximum density, minimum density, and mean density of the entire region of a frame or a specific region of film, the mean density of a region corresponding to the face of a person, and the like.

Figure 6:
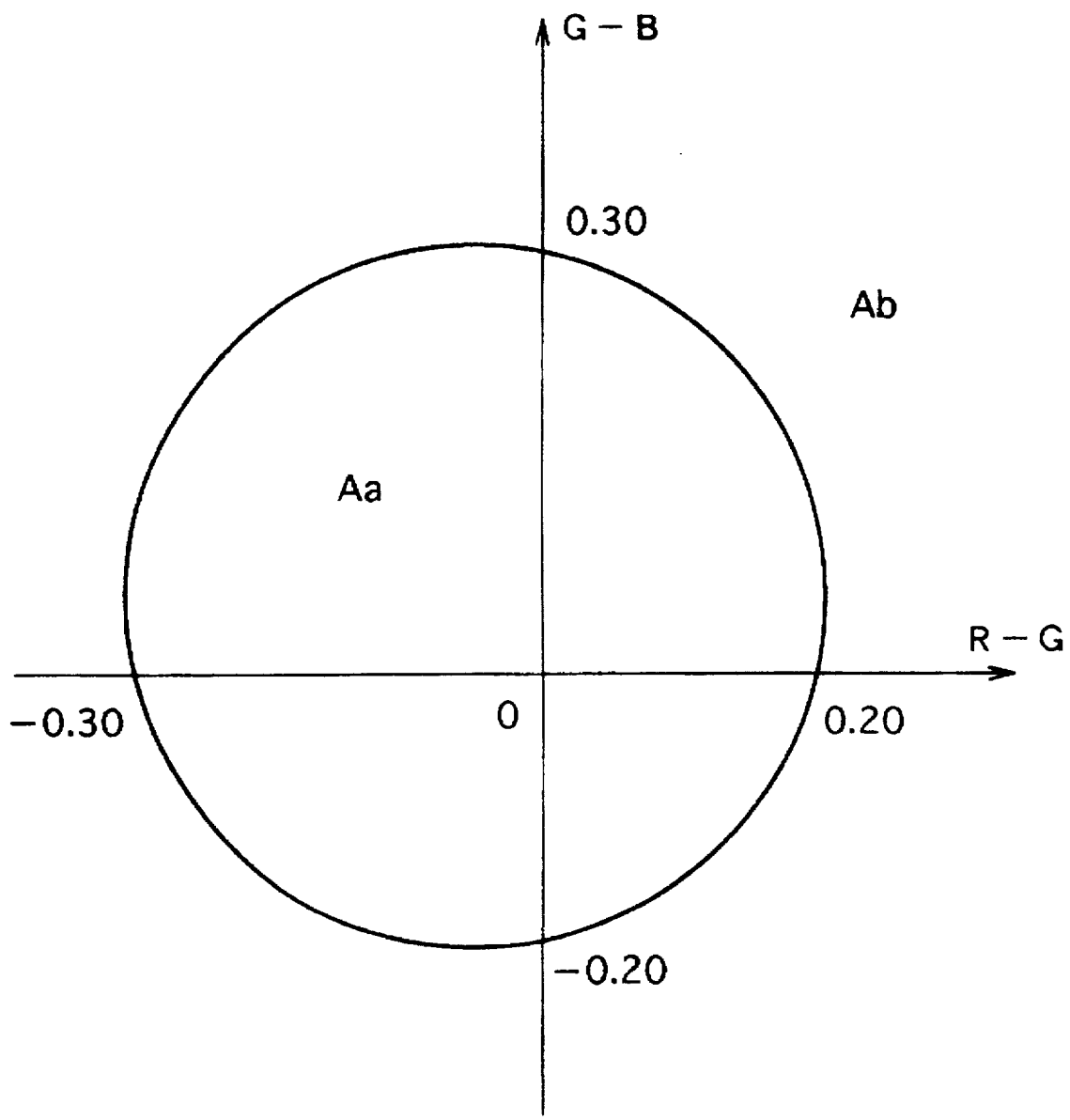
FIG. 6 is a chart showing a color coordinates system for classifying standardized data of three colors.

In connection with a process of selecting pixels in step 130, a color coordinates system is defined, as shown in FIG. 6, in which the abscissa represents the difference between standardized data of R and G, i.e. R–G and the ordinate represents the difference between standardized data of G and B, i.e. G–B. Also, a color region Aa including the origin and a color region Ab (other than the color region Aa) are defined. Standardized data of three colors are classified into these regions Aa and Ab. Photometric data are classified, i.e. pixels are classified according to the classification of the standardized data of three colors.

Standardized data sets of three colors are classified with respect to the boundary between color region Aa and color region Ab. That is, standardized data sets of three colors are classified into a data group which includes data having small color differences with respect to a reference value (origin) and a data group which includes data having large color differences with respect to the reference value. According to the present embodiment, in step 130, photometric data, i.e. pixels associated with standardized data belonging to color region Aa are selected as photometric data for use in subsequent processes.

A technique disclosed in U.S. Pat. No. 4,641,959 can be used for calculating an image characteristic value based on selected pixels as described above.

In step 134, an exposure amount is determined by a conventional method using the calculated image characteristic value. In step 136, the light-quality adjusting filter 60 is controlled in accordance with thus determined exposure amount, and then exposure is carried out so as to make a print.

In step 138, whether or not exposure is completed for a single piece of film is determined. When it is judged in step 138 that exposure has not been completed for the single piece of film, then processing returns to step 122, and the above-mentioned processes are repeated. When it is judged in step 138 that exposure has been completed for the single piece of film, then the first mean image data and photometric data stored in the photometric data memory 30 are erased in step 140 in order to prepare to carry out an exposure process for the next piece of film.

According to the example described above, the first mean image data are calculated after photometric data of an image in each frame are stored during the negative film being transported in the first direction and before the negative film starts to be transported in the second direction. However, the first mean image data may be calculated in various forms. For example, a first part of the first mean image data may be obtained from photometric data of frames in the second half of the negative film while the negative film is transported in the first direction, and a second part or the remaining part of the first mean image data may be obtained from photometric values of frames in the first half of the single piece of negative film while the negative film is being transported in the second direction. In this case, the second part of the first mean image data obtained from the first half of the single piece of negative film may be added to the first part of the first mean image data obtained from the second half of the single piece of negative film.

Embodiment 2

Figure 2:
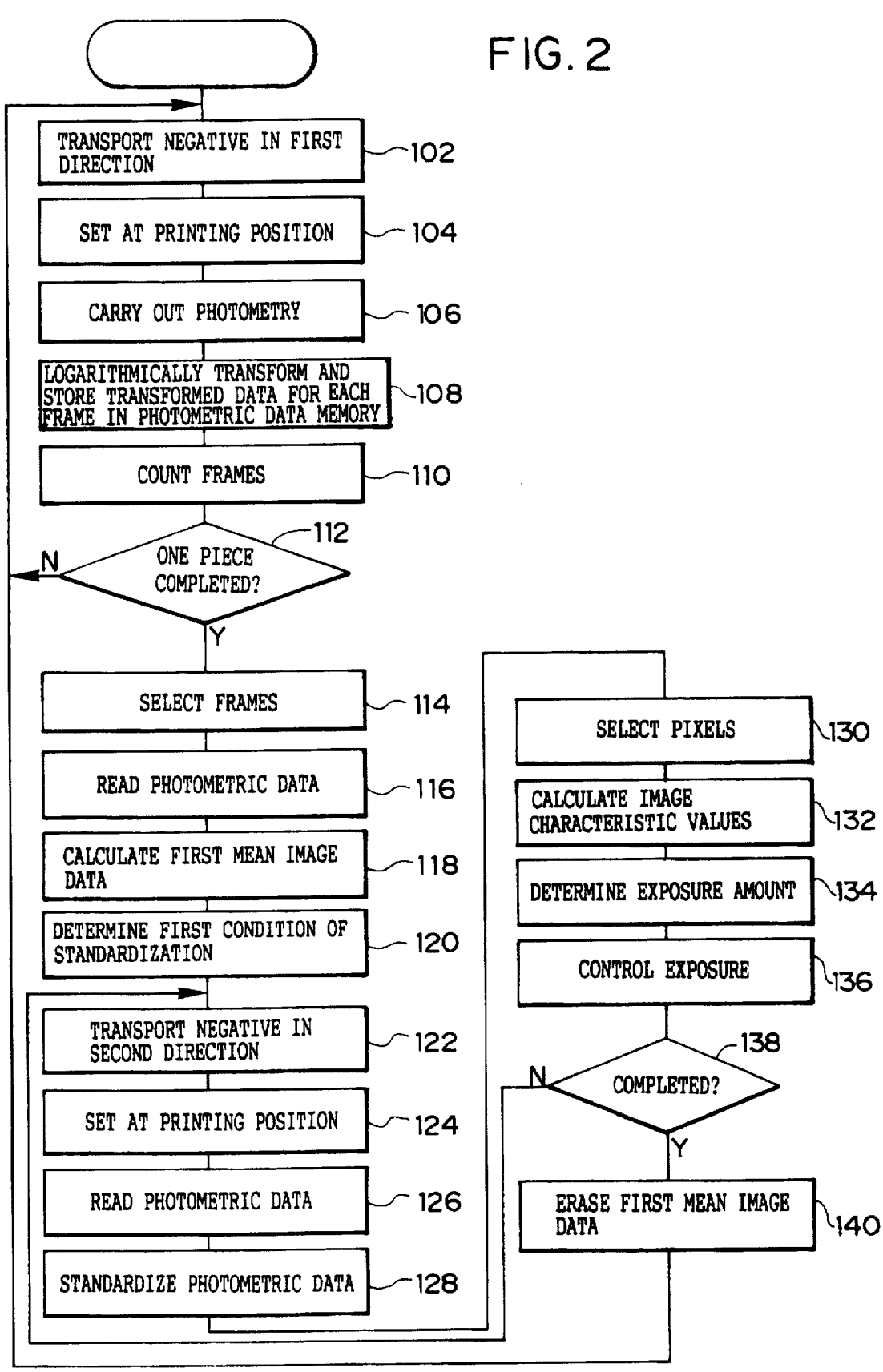
FIG. 2 is a flowchart showing an exposure amount control routine according to a first embodiment of the present invention.
Figure 3:
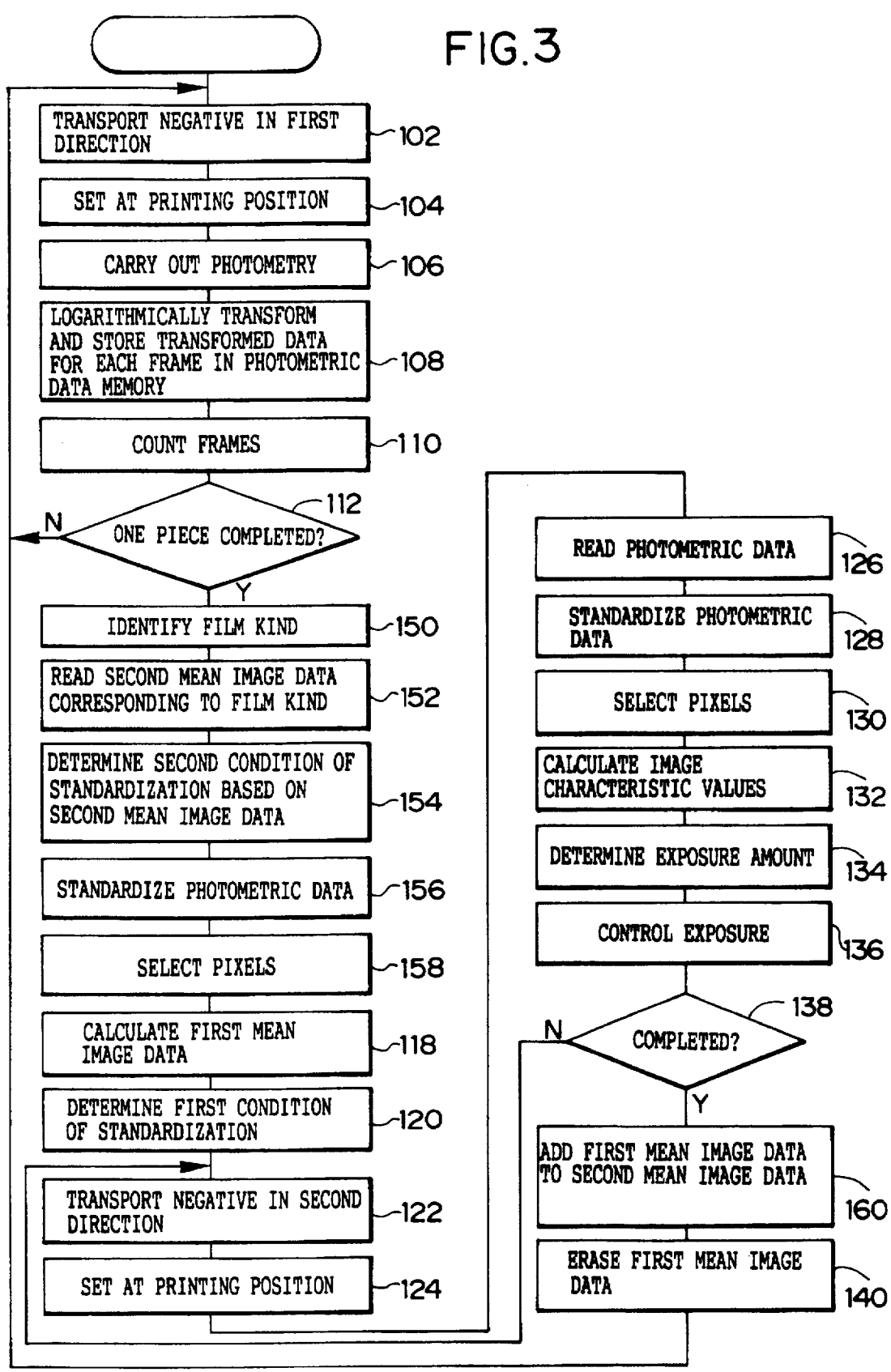
FIG. 3 is a flowchart showing an exposure amount control routine according to a second embodiment of the present invention.

An exposure amount control routine of a second embodiment of the present invention will now be described with reference to FIG. 3. According to the present embodiment, a second condition of standardization is determined using second mean image data, which are mean image data of images on many pieces of film of the same kind. Based on thus determined second condition of standardization, photometric data are standardized. Thus standardized photometric data are classified so as to select pixels. Based on photometric data of thus selected pixels, first mean image data are calculated which are mean image data of a plurality of images including an image in a frame to be printed. In FIG. 3, the same steps as those in FIG. 2 are denoted by common reference numerals, and the description thereof is omitted.

If it is judged in step 112 that photometry and the storage of photometric data have been completed with a single piece of film, then the kind of negative film is identified in step 150 based on a DX code which is detected by the detector 52. In step 152, second mean image data corresponding to the identified film kind are read from the RAM. In step 154, a second condition of standardization similar to that described above is determined based on the read second mean image data. In step 156, photometric data are standardized in the manner as described above.

In step 158, as described above, photometric data whose standardized data belong to the color region Aa are selected. In step 118, the first mean image data are calculated in the manner as described above.

After control for exposure is completed with a single piece of film, in step 160, the first image data are added to the second mean image data which is previously stored in association with the kind of film. As a result, the second mean image data become mean image data of many pieces of film of the same kind.

In the second embodiment, the first mean image data are calculated based on the second mean image data which are stable and not influenced by the kind of a subject on a single piece of film, whereby the first mean image data do not include pixels corresponding to a saturated subject. Accordingly, even for negative film containing many deviative subjects, the first mean image data are obtained at a high accuracy. Therefore, an exposure amount can be determined at a high accuracy, whereby high-quality prints can be made.

An exposure amount in the present embodiment can be determined by the following formula which is disclosed in U.S. Pat. No. 5,353,095.

$$\log Ej = Sj\, Aj\, (Dij - Dfj) + Kj$$

where j: Any one of B, R, and G i: Individual film log Ej: Logarithm of exposure amount Dij: Controlled variable for exposure which is obtained by adding first mean image data and/or second mean image data multiplied by a predetermined weight coefficient and an image characteristic value of a frame to be printed multiplied by a predetermined weight coefficient Dfj: Density of reference negative film Kj: Constant dependent on color paper and photographic printing apparatus Sj: Slope control coefficient (0.5 to 2.0)

Aj: Color correction coefficient (=1.0)

Embodiment 3

An exposure amount control routine of a third embodiment of the present invention will now be described with reference to FIG. 4. The above-mentioned first mean image data well reflects variations in film characteristics and a difference in photographic light source, but the data accuracy becomes insufficient when the number of images in a frame is small and the data are likely to be influenced by the kind of a subject, for example, a green of lawn, a blue of the sky or the like. While, the second mean image data are not suited to detect variations in film characteristics and a difference in photographic light source, but is stable and less likely to be influenced by the kind of a subject. Thus, according to the present embodiment, when the second condition of standardization is determined, the first mean image data and the second mean image data are compared, and the first mean image data and/or the second mean image data are selected.

Figure 4:
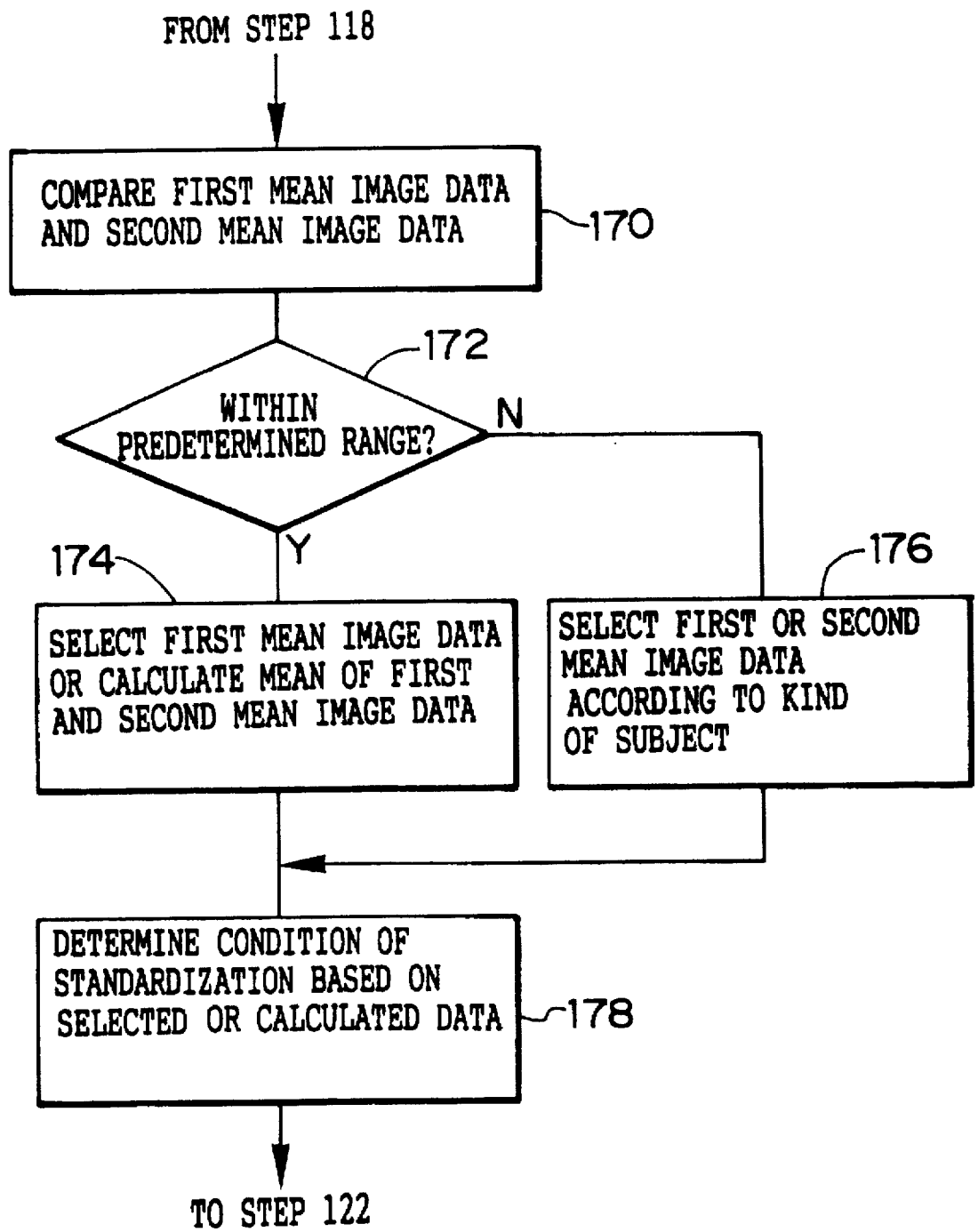
FIG. 4 is a flowchart showing an exposure amount control routine according to a third embodiment of the present invention.

The control routine of the present embodiment can be obtained by adding the processes of steps 170 to 178 shown in FIG. 4 between step 118 and step 122 of the control routine of FIG. 3.

In step 170, the first mean image data and the second mean image data are compared. In step 172, it is judged whether or not the difference between the first mean image data and the second mean image data falls in a predetermined range. If it is judged in step 172 that the difference between the first mean image data and the second mean image data falls in a predetermined range, then in step 174, the first mean image data are selected, or the mean of the first mean image data and the second mean image data are calculated. In step 178, condition of standardization is determined based on the selected first mean image data or the mean of the first mean image data and the second mean image data in a similar manner as described above, and the first mean image data are calculated as described above.

If it is judged in step 172 that the difference between the first mean image data and the second mean image data falls outside a predetermined range, then in step 176, the first mean image data or the second mean image data are selected depending on whether falling outside a predetermined range is caused by the kind of a subject such as lawn (green), blue sky (blue) or the like or by the kind of a photographic light source or variations in film characteristics. That is, when falling outside a predetermined range is caused by a subject which deviates in color of lawn, blue sky or the like from an average subject, the first mean image data are selected. For other kinds of subjects, the second mean image data are selected. A known method disclosed, for example, in U.S. Pat. No. 4,416,539 can be used for this determination.

Accordingly, in the case of a subject having a deviative color of lawn, blue sky or the like, a color failure can be prevented from taking place. On the contrary, in the case where a deviative color is caused by the kind of a photographic light source or variations in film characteristics, the first mean image data are used, whereby pixels corresponding to gray of a subject or average subject colors can be selected even when a difference in the kind of a photographic light source or variations in film characteristics are involved.

In the embodiments described above, the first and second directions are opposed to each other. However, in an apparatus wherein a photometric section and an exposure section are spaced substantially by a distance equivalent to the length of a single piece of film, as disclosed in U.S. Pat. No. 4,589,766, the first and second directions may be in the same direction.

When the present invention is embodied by coating the entire surface of negative film with a transparent magnetic layer and by recording magnetic data in the magnetic layer, the magnetically recorded data may be read in a transporting process in the first direction at the time of simultaneous printing. In a transporting process in the second direction at the time of simultaneous printing, density correction amount data including manual corrections may be recorded, or color correction amount data may be additionally recorded.

In the case where data are recorded as described above, when a reorder is received, recorded correction amount data are read from film in a transporting process in the first direction, whereby whether or not correction amounts are available is determined. When correction amount data are recorded on the film, the recorded correction amount data are rearranged so as to correspond to individual frames, and also photometry is carried out. Then, in a transporting process in the second direction, a basic exposure amount is calculated, and the read correction amount is added to the calculated basic exposure amount, thereby determining an exposure amount. Based on thus obtained exposure amount, printing is carried out. In this case, an exposure amount may be calculated based on photometric data which are obtained by scanning. Then, thus calculated exposure amount and correction amount may be compared to select the exposure amount or correction amount, and printing is carried out based on the selected exposure amount or correction amount. These manual correction amount or corrections data including manual correction amount may be stored in a leader provided at the leading end or tail end of a film.

As has been described above, according to the embodiments, photometric data of images on a film, not characteristic values thereof, are stored. Accordingly, characteristic values of images on the film can be obtained using the first mean image data, whereby an exposure amount can be determined. Also, since photometric data of images on the film is stored, it is not necessary to carry out photometry twice on images on the film. Further, since photometric data are stored, while one frame is undergoing printing, an exposure amount can be calculated for the next frame.

Also, the number of frames and the contents of frames of a single piece of film can be determined. Accordingly, the first mean image data can be obtained accurately and efficiently by selecting frames.

According to the second and third embodiments, the first mean image data are obtained based on the second mean image data so as to remove data which deviate greatly from characteristics of the same kind of film due to the kind of a subject. Accordingly, even when a subject has any deviation, characteristics of images including an image in a frame to be printed can be obtained accurately and efficiently. If photometric data are not selected based on the second mean image data, whether a color deviation is caused by the kind of a subject or the kind of film cannot be directly determined from a small number of frames.

As a result of standardizing photometric data of images on the film based on the first mean image data as described above, the following effects are obtained.

(1) When the first mean image data are used, it is possible to accurately obtain characteristics of a film having larger variations, compared to the case of using the second mean image data.

(2) Even when a subject is photographed with a light source other than daylight (for example, tungsten light), the first mean image data allows gray under the light source to be detected better than the second mean image data.

(3) An image characteristic value of a frame to be printed is obtained from those pixels that are selected based on the first mean image data, thereby improving an accuracy of an image characteristic value. When an exposure amount is determined using thus obtained image characteristic value and the first mean image data, setting a high weight coefficient for the image characteristic value does not cause color dispersion to get worse. Conventionally, when a high weight coefficient is set for the first mean image data in order to reduce color dispersion, certain film ends with the opposite result due to weak correction for a photographic light source and defective film characteristics.

(4) As a result of improvement in accuracy of an image characteristic value and the first mean image data of images on the film for use in determining an exposure amount, an accurate exposure amount is determined, whereby high, uniform print quality can be obtained..

What is claimed is:

1. A method of making a print having a first transporting process for transporting a film in a first direction and a second transporting process for transporting the film in a second direction, wherein an image on the film is copied on a photographic copying apparatus so as to make a print, said method comprising the steps of:

carrying out photometry on at least all images on the film that are to be copied by dividing each of the images that are to be copied into a number of pixels, logarithmically transforming thus obtained photometric values into photometric data sets, and storing all thus transformed photometric data sets in correspondence with individual images on the film in said first transporting process;

reading a plurality of said photometric data sets and determining a condition of selection for selecting photometric data of pixels for use in determining an exposure amount; and selecting photometric data of pixels which meet the condition of selection from photometric data sets of images on the film that are to be copied and making a print based on thus selected photometric data in said second transporting process.

2. A method of making a print according to claim 1, wherein said first direction is along the length of the film and wherein said second direction is opposed to said first direction.

3. A method of making a print according to claim 2, wherein a transport in said first direction starts from either one of lead end and tail end of the film, and a transport in said second direction starts from another one of lead end and tail end of the film.

4. A method of making a print according to claim 1, wherein each image on the film is an image in a frame on the film.

5. A method of making a print according to claim 4, wherein said photometry is carried out on all pixels into which images on the film are divided.

6. A method of making a print according to claim 5, wherein said photometry is carried out for each of at least three primary colors of red, green, and blue with respect to all pixels into which an image on the film is divided.

7. A method of making a print according to claim 6, wherein said storage is carried out for each frame of the film and for each pixel of each frame and also for a logarithmically transformed photometric data set with respect to each of at least said three primary colors of red, green, and blue.

8. A method of making a print according to claim 1, wherein said storage is carried out on said photometric data which is compressed.

9. A method of making a print according to claim 1, wherein said condition of selection is a condition of standardization which is determined based on first mean image data which is calculated from a plurality of selectively read ones of said photometric data sets, and photometric data is selected in said second transporting process in such a manner that photometric data sets of images on the film that are to be copied are read and standardized in accordance with said condition of standardization and that photometric data of pixels for use in determining an exposure amount is selected based on thus standardized photometric data.

10. A method of making a print according to claim 9, wherein said first mean image data are either mean color densities or mean color density differences which are obtained from photometric data sets of all images in at least frames to be copied with respect to density of any one of at least said three primary colors of red, green, and blue and mean density of at least said three primary colors.

11. A method of making a print according to claim 9, wherein said first mean image data are calculated in a manner in which first mean image data are calculated from a plurality of selectively read said photometric data sets, photometric data sets falling outside a predetermined range with respect to thus-calculated first mean image data are removed from the selectively read photometric data sets, and thus obtained residual photometric data sets are used for the calculation.

12. A method of making a print according to claim 9, wherein said standardization of photometric data converts photometric data so as to render density and/or colors fixed for the same subject regardless of a difference in the kind of film and/or development process.

13. A method of making a print according to claim 12, wherein said standardization of photometric data is carried out in a manner in which photometric data of a low-density portion are subtracted from each of photometric data sets of at least three primary colors, and a conversion to density of one of at least three primary colors is made from density of each of other colors in accordance with a predetermined density conversion formula.

14. A method of making a print according to claim 13, wherein said photometric data of a low-density portion are photometric data of a base portion of the film.

15. A method of making a print according to claim 13, wherein said pixels for use in determination of an exposure amount are pixels associated with standardized photometric data which belong to a predetermined region including the origin in a color coordinates system which takes the difference between standardized photometric data of two colors of at least said three primary colors as an axis of coordinates.

16. A method of making a print according to claim 15, wherein said determination of an exposure amount is carried out by calculating an image characteristic value from said pixels for use in determination of an exposure amount.

17. A method of making a print according to claim 16, wherein said image characteristic value is at least any one of maximum density, minimum density, and mean density of the entire region of a frame of the film or a specific region of the film, mean density of a region corresponding to the face of a person.

18. A method of making a print according to claim 9, wherein said mean image data are calculated from photometric data of pixels which are selected based on second mean image data which are obtained from photometric data of a number of images on a number of pieces of film.

19. A method of making a print according to claim 18, wherein said first mean image data are calculated in the steps of identifying the kind of film, reading second mean image data corresponding to thus identified kind of film, determining a second condition of standardization based on thus read second mean image data, and standardizing said photometric data in accordance with thus determined second condition of standardization.

20. A method of making a print according to claim 18, wherein at least either of said first mean image data and said second mean image data are selected so as to determine said condition of standardization.

* * * * *